US010262269B2

(12) United States Patent
Lynagh (10) Patent No.: US 10,262,269 B2
(45) Date of Patent: Apr. 16, 2019

(54) EVALUATING RECURSIVE AND EXIVERSAL PREDICATES

(71) Applicant: SEMMLE LIMITED, Oxford (GB)

(72) Inventor: Ian Lynagh, Oxford (GB)

(73) Assignee: Semmle Limited, Oxford (GB)

( * ) Notice: Subject to any disclaimer, the term of this patent is extended or adjusted under 35 U.S.C. 154(b) by 687 days.

(21) Appl. No.: 14/840,448

(22) Filed: Aug. 31, 2015

(65) Prior Publication Data

US 2017/0061293 A1 Mar. 2, 2017

(51) Int. Cl.
*G06N 5/04* (2006.01)
*G06F 17/30* (2006.01)

(52) U.S. Cl.
CPC ......... *G06N 5/04* (2013.01); *G06F 17/30513* (2013.01)

(58) Field of Classification Search
CPC ............................ G06F 17/30513; G06N 5/04
USPC ........................................................ 717/114
See application file for complete search history.

(56) References Cited

U.S. PATENT DOCUMENTS

| 5,546,570 | A | 8/1996 | McPherson, Jr. et al. |
| 7,337,167 | B2 | 2/2008 | Muras |
| 9,015,193 | B1 * | 4/2015 | de Moor ........... G06F 17/30595 707/773 |
| 9,146,960 | B2 | 9/2015 | Ghazal et al. |
| 2009/0240640 | A1 * | 9/2009 | Blain ................... G01N 17/043 706/12 |
| 2009/0240649 | A1 | 9/2009 | Sereni et al. |

FOREIGN PATENT DOCUMENTS

WO 1992/015066 9/1992

OTHER PUBLICATIONS

European Extended Search Report for Application No. 16186254.5, dated Jan. 23, 2017, 10 pages.

\* cited by examiner

*Primary Examiner* — John Q Chavis
(74) *Attorney, Agent, or Firm* — Fish & Richardson P.C.

(57) ABSTRACT

Methods, systems, and apparatus, including computer programs encoded on computer storage media, for evaluating recursive predicates and exiversal predicates. One of the methods includes receiving an expression having an exiversal quantifier that specifies a condition x and a condition y. The expression is transformed into a second expression having multiple recursive calls, the second expression having a first non-negated term with a first recursive call in the condition y, and a second negated term with a second recursive call in the condition y. The second expression is evaluated using evaluation predicates that include a single delta predicate that replaces only the recursive call in the first non-negated term to identify data elements in the relation having at least one attribute satisfying the condition x and the condition y, and, for each attribute of the data element satisfying the condition x, the attribute also satisfies the condition y.

28 Claims, 3 Drawing Sheets

EVALUATING RECURSIVE AND EXIVERSAL PREDICATES

BACKGROUND

This specification relates to data processing, in particular, to processing recursive statements.

In some query languages, a predicate is a function defined by one or more statements that maps one or more input parameters to true or false. A predicate operates on an associated relation and returns true or false depending on whether a tuple defined by the input parameters occurs in the associated relation.

A relation is a set of tuples $(t_1, \ldots, t_n)$, each tuple having $n \geq 1$ data elements $t_i$. Each element $t_i$ represents a corresponding value, which may represent a value of a corresponding attribute having an attribute name. Relations are commonly thought of as, represented as, and referred to as tables in which each row is a tuple and each column is an attribute.

Some query languages support recursive statements, which are statements that reference their own output. An example query language that supports recursive statements is Datalog. The following example statement can be written in Datalog:

f(i):-i=1; (i=2, f(1)); (i=3, f(2))

This statement in Datalog recursively defines a predicate f having input parameter i. The predicate can be expressed as f(i), or for brevity, f, whose meaning will be apparent from the context. The :- operator defines the predicate f(i) to have the body "i=1; (i=2, f(1)); (i=3, f(2))". A semicolon represents disjunction, i.e., logical "or," and a comma represents conjunction, i.e., logical "and." For clarity, logical "and" will occasionally be spelled out as an explicit "and" operator.

The semantics of the predicate f(i) in Datalog is that the body of f(i) is evaluated to compute the associated relation for f(i). The associated relation is the smallest set of values i such that the body of f(i) is satisfied, i.e., evaluates to true. Then, when a value for i is provided as input to the predicate f(i), the predicate evaluates to true if the value occurs in the associated relation for f(i) and false otherwise. For example, f(1) evaluates to "true" because the term "i=1" in the body defines the associated relation to include the tuple (1). Therefore, because the associated relation includes (1), f(1) evaluates to "true." Evaluation of predicates is typically performed by an evaluation engine for the query language implemented by software installed on one or more computers.

The relation over which f(i) is evaluated may be specified within the body of the predicate. In this example, the body of f(i) defines a relation having a set of singleton tuples, e.g., {1, 2, 3}. However, the relation over which f(i) is evaluated may alternatively be specified by another predicate or may be explicitly defined. For example, the relation may be defined by a table in a database.

The meaning of evaluating a recursive predicate with a free variable is to compute the least fixed point of the predicate. The least fixed point is a relation having a set of tuples that is a subset of all other fixed points of the predicate. Evaluation engines that evaluate recursive predicates can use a number of different procedures for finding the least fixed point.

Some methods for finding the least fixed point of a recursive predicate recast the predicate into a number of nonrecursive evaluation predicates. The evaluation predicates are then evaluated in sequence until a least fixed point is reached. In general, recasting a recursive predicate into a number of nonrecursive evaluation predicates may be referred to as "flattening" the recursion.

An evaluation engine for a particular query language can recast a recursive predicate as follows. A first nonrecursive predicate is defined as an empty relation. In addition to the empty relation, a sequence of subsequent nonrecursive predicates are defined according to the body of the recursive predicate. In doing so, the evaluation engine replaces each recursive term with a reference to a previous nonrecursive predicate. Logically, the number of nonrecursive predicates that can be generated is unbounded. However, the evaluation engine will halt evaluation when the least fixed point is reached.

The evaluation engine then evaluates the nonrecursive predicates in order and adds resulting tuples to the associated relation for the predicate. The evaluation engine stops when a nonrecursive predicate is reached whose evaluation adds no additional tuples to the relation. The final result is the associated relation for the recursively defined predicate.

Using this procedure, evaluating each successive predicate regenerates all of the results that have already been generated. Thus, this approach is sometimes referred to as "naive evaluation."

For simplicity, predicates in this specification will generally be represented logically and may not necessarily correspond to a language construct of any particular query language. However, the implementation of the illustrated logical predicates by an evaluation engine is normally straightforward for query languages that support recursive predicates.

Thus, to illustrate naive evaluation, an evaluation engine can recast the predicate above into the following nonrecursive evaluation predicates.

$f_0(i)$:-{ }
$f_1(i)$:-i=1; (i=2, $f_0(1)$); (i=3, $f_0(2)$)
$f_2(i)$:-i=1; (i=2, $f_1(1)$); (i=3, $f_1(2)$)
$f_3(i)$:-i=1; (i=2, $f_2(1)$); (i=3, $f_2(2)$)
. . .

Or, for brevity, the evaluation predicates may be represented as:

$f_0(i)$:-false
$f_{n+1}(i)$:-i=1; (i=2, $f_n(1)$); (i=3, $f_n(2)$)

At first glance, this notation may look like a recursive definition, but it is not. This is because the subscripts of the predicates denote different nonrecursive predicates occurring in the potentially unbounded sequence of predicates. In other words, the predicate $f_{n+1}$ is not recursive because it references $f_n$, but not itself. The evaluation engine then evaluates the nonrecursive predicates in order to find the least fixed point.

Naive evaluation of f(i) starts by evaluating $f_0(i)$, which is defined to be the empty relation. Naive evaluation then proceeds as illustrated in TABLE 1.

TABLE 1

| Predicate | Previous relation | Current relation | Comments |
|---|---|---|---|
| $f_1(i)$ | { } (Empty) | {1} | The relation of $f_0(i)$ is empty, represented as "{ }". Thus, $f_1$ evaluates to: i = 1; (i = 2, 1 is in { }); (i = 3, 2 is in { }). Neither 1 nor 2 are in the empty relation. Thus, the only tuple that is generated is 1 from the term i = 1. |

TABLE 1-continued

| Predicate | Previous relation | Current relation | Comments |
|---|---|---|---|
| $f_2(i)$ | {1} | {1, 2} | $f_2$ evaluates to:<br>i = 1; (i = 2, $f_1$(1)); (i = 3, $f_1$(2))<br>or<br>i = 1; (i = 2, 1 is in {1}); (i = 3, 2 is in {1})<br>The value 2 is not in the relation {1}.<br>Thus, the only tuples that are generated are 1 from the term i = 1 and 2 from the term i = 2, $f_1$(1). |
| $f_3(i)$ | {1, 2} | {1, 2, 3} | $f_3$ evaluates to:<br>i = 1; (i = 2, $f_2$(1)); (i = 3, $f_2$(2))<br>or<br>i = 1; (i = 2, 1 is in {1, 2}); (i = 3, 2 is in {1, 2})<br>All three terms are true, thus the tuples 1, 2, and 3 are generated. |
| $f_4(i)$ | {1, 2, 3} | {1, 2, 3} | f4 evaluates to:<br>i = 1; (i = 2; $f_3$(1)); (i = 3, $f_3$(2))<br>or<br>i = 1; (i = 2, 1 is in {1, 2, 3}); (i = 3; 2 is in {1, 2, 3})<br>Again, all three terms are true, thus the tuples 1, 2, and 3 are generated. |

After $f_4(i)$ is evaluated, no additional tuples are added to the relation. Therefore, the evaluation engine can determine that the least fixed point has been reached.

Languages that allow recursive predicates generally require the recursive predicates to be monotonic. That is, on each iteration, evaluation of the predicate results only in tuples being added to the relation, but never removed from the relation.

One example class of non-monotonic recursive predicates is predicates with a recursive call under an odd number of negations. Recursive calls under an odd number of negations can result in an evaluation engine computing a relation that never converges.

For example, the following recursive predicate is non-monotonic:

f(i):-(i=1, not f(2)); (i=2, f(1))

The problem is the single negated recursive call "not f(2)". Naive evaluation of this recursive predicate would result in the following cycling of tuples in the relation:

$f_0(i)$:={ }
$f_1(i)$:={1}
$f_2(i)$:={1, 2}
$f_3(i)$:={2}
$f_4(i)$:={ }
$f_5(i)$:={1}
$f_6(i)$:={1, 2}
$f_7(i)$:={2}
$f_8(i)$:={ }
...

Therefore, evaluation engines for recursive predicates generally reject recursive predicates if they include a recursive call under an odd number of negations.

However, predicates in which every recursive call is under an even number of negations are monotonic. Thus, the following predicate is monotonic:

f(i):-not (i=1, not f(2)); (i=2, f(1))

because every recursive call is under an even number of negations, i.e., 2 negations for f(2) and zero for f(1).

Another prior art procedure for evaluating recursive predicates is referred to as "semi-naive evaluation." When using semi-naive evaluation, an evaluation engine flattens the recursion of the predicate in a different way than naive evaluation. In particular, the evaluation engine defines a delta predicate whose associated relation is defined to include only the new tuples found on each iteration. The least fixed point is found when an iteration is reached in which the delta predicate's associated relation is empty.

For example, an evaluation engine can use semi-naive evaluation to find the least fixed point of the following example predicates:

f(i):-i=1; i=2; i=3
g(i):-i=1; exists(j: j=i−1, f(i), g(j))

The term "exists(j: j=i−1, f(i), g(j))" has an existential quantifier. A term having an existential quantifier may be referred to as an existential term. This existential term asserts that there is a j such that j is equal to i−1 and that i is in the relation of f(i) and that j is in the relation of g(j).

An evaluation engine can flatten the recursive predicate g(i) by defining the following nonrecursive evaluation predicates:

$\delta g_0(i)$:-{ }
$g_0(i)$:-{ }
$\delta g_{n+1}(i)$:-(i=1; exists(j: j=i−1, f(i), $\delta g_n(j)$)), not $g_n(i)$
$g_{n+1}(i)$:-$g_n(i)$; $\delta g_{n+1}(i)$ As mentioned above, semi-naive evaluation uses an evaluation predicate that is referred to as a delta predicate. A system can generate the delta predicate by replacing the recursive call in the original predicate with a nonrecursive call to the previous delta predicate. The system then generates a conjunction of the result with a negation of the predicate from the previous iteration. Thus, the delta predicate is defined to include only new tuples found in a particular iteration of the evaluation. Thus, the extra term "not $g_n(i)$" at the end of the definition for $\delta g_{n+1}(i)$ indicates that previously found tuples do not satisfy the delta predicate for $\delta g_{n+1}(i)$.

Evaluation of the example recursive predicate using semi-naive evaluation is illustrated in TABLE 2. An evaluation engine need not compare a previous relation to a current relation as was done for naive evaluation. Rather, the evaluation engine can halt when the first empty delta predicate is found.

TABLE 2

| Predicate | Relation | Comments |
|---|---|---|
| $\delta g_0(i)$ | { } | Empty by definition |
| $g_0(i)$ | { } | Empty by definition |
| $\delta g_1(i)$ | {1} | $\delta g_1(i)$ evaluates to:<br>(i = 1; exists(j: j = i − 1, f(i), $\delta g_0(j)$)), not $g_0(i)$<br>or<br>(i = 1; exists(j: j = i − 1, i is in {1, 2, 3}, j is in { })), i is not in { }<br>Thus, {1} is generated. |
| $g_1(i)$ | {1} | $g_1(i)$ evaluates to:<br>$g_0(i)$; $\delta g_1(i)$<br>or<br>i is in { }; i is in {1}<br>The only value for i that satisfies this predicate is 1.<br>Thus, {1} is generated. |
| $\delta g_2(i)$ | {2} | $\delta g_2(i)$ evaluates to:<br>(i = 1; exists(j: j = i − 1, f(i), $\delta g_1(j)$)), not $g_1(i)$<br>or<br>(i = 1; exists(j: j = i − 1, i is in {1, 2, 3}, j is in {1}))), i is not in {1}<br>The only value for i for which j = 1 and j = i − 1 is 2.<br>Thus, {2} is generated. |
| $g_2(i)$ | {1, 2} | $g_2(i)$ evaluates to:<br>$g_1(i)$; $\delta g_2(i)$<br>or<br>i is in {1}; i is in {2} |

TABLE 2-continued

| Pred-icate | Relation | Comments |
|---|---|---|
| $\delta g_3(i)$ | {3} | The values for i that satisfy this predicate are 1 and 2. Thus, {1, 2} is generated.<br>$\delta g_3(i)$ evaluates to:<br>(i = 1; exists(j: j = i − 1, f(i), $\delta g_2(j)$)), not $g_2(i)$<br>or<br>(i = 1: exists(j: j = i − 1, i is in {1, 2, 3}, j is in {2}))),<br>i is not in {1, 2}<br>The only value of i for which j = 2 and j = i − 1 is i = 3. Thus, {3} is generated. |
| $g_3(i)$ | {1, 2, 3} | $g_3(i)$ evaluates to:<br>$g_2(i)$; $\delta g_3(i)$<br>or<br>i is in {1, 2}; i is in {3}<br>The values for 1 that satisfy this predicate are 1, 2, and 3. Thus, {1, 2, 3} is generated. |
| $\delta g_4(i)$ | { } | $\delta g_4(i)$ evaluates to:<br>(i = 1; exists(j: j = i − 1, f(i), $\delta g_3(j)$)), not $g_3(i)$<br>or<br>(i = 1: exists(j: j = i − 1, i is in {1, 2, 3}, j is in {3}))),<br>i is not in {1, 2, 3}<br>There is no value of i such that i is in {1, 2, 3}, and for which j = 3 and j = i − 1.<br>Thus, the delta predicate is empty and evaluation stops. |

Using delta predicates to find the least fixed point becomes more complicated when a predicate expression includes multiple recursive calls.

For example, the following recursive predicate includes multiple recursive calls in a single conjunction:

f(i):-i=1; (i=2, f(1)); (i=3, f(1)); (i=4, f(3)); (i=5, f(2), f(4))

In this example predicate, the last disjunct includes both f(2) and f(4). This term asserts that i is equal to 5 and that 2 and 4 are both in the relation f.

If using a single delta predicate, tuples generated by evaluating f(2) and f(4) may not appear in the same delta predicate at the same time. Thus, in order to flatten the recursion of this recursive predicate, the evaluation engine needs to generate multiple delta predicates, one delta predicate for each recursive call in each disjunct that includes multiple recursive calls. For example, the evaluation engine can generate the following evaluation predicates for f(i):

$\delta f_0(i)$:-{ }
$f_0(i)$:-{ }
$\delta_0 f_{n+1}(i)$:-i=1; (i=2, $\delta f_n(1)$); (i=3, $\delta f_n(1)$); (i=4, $\delta f_n(3)$); (i=5, $\delta f_n(2)$, $f_n(4)$)
$\delta_1 f_{n+1}(i)$:-i=1; (i=2, $\delta f_n(1)$); (i=3, $\delta f_n(1)$); (i=4, $\delta f_n(3)$); (i=5, $f_n(2)$, $\delta f_n(4)$)
$\delta f_{n+1}(i)$:-$\delta_0 f_{n+1}(i)$; $\delta_1 f_{n+1}(i)$
$f_{n+1}(i)$:-$f_n(i)$; $\delta f_{n+1}(i)$ By this new definition, the delta predicate $\delta f_{n+1}(i)$ at each iteration is a disjunction of multiple sub-delta predicates $\delta_0 f_{n+1}(i)$ and $\delta_1 f_{n+1}(i)$. Each of the sub-delta predicates uses a previous delta predicate on a different recursive call within the same disjunction f.

Semi-naive evaluation can fail to produce correct results when a recursive call is negated. For example, the following recursive predicate includes a negated recursive call:

f(i):-i=1; i=2; i=3
g(i):-f(i), not exists(j: f(j), j<i, not g(j))

Naive evaluation would flatten the recursion of g(i) to the following evaluation predicates:

$g_0(i)$:-{ }
$g_{n+1}(i)$:-f(i), not exists(j: f(j), j<i, not $g_n(j)$)

Naive evaluation of g(i) would then progress as illustrated in TABLE 3.

TABLE 3

| Pred-icate | Previous relation | Current relation | Comments |
|---|---|---|---|
| $g_1(i)$ | { } | {1} | $g_0$ is defined to be empty. Thus, $g_1$ evaluates to:<br>f(i), not exists(j: f(j), j < i, not $g_0(j)$)<br>or<br>i is in {1, 2, 3} and there does not exist a value of j such that j is in {1, 2, 3} and j < i, and j is not in { }<br>The only value of i for which this is true is 1. Thus, the only tuple that is generated is {1}. |
| $g_2(i)$ | {1} | {1, 2} | $g_2$ evaluates to:<br>f(i), not exists(j: f(j), j < i, not $g_1(j)$)<br>or<br>i is in {1, 2, 3} and there does not exist a value of j such that j is in {1, 2, 3}, j < i, and j is not in {1}<br>The only values of i for which this is true are 1 and 2. Thus {1, 2} is generated. |
| $g_3(i)$ | {1, 2} | {1, 2, 3} | $g_3$ evaluates to:<br>f(i), not exists(j: f(j), j < i, not $g_2(j)$)<br>or<br>i is in {1, 2, 3} and there does not exist a value of j such that j is in {1, 2, 3}, j < i, and j is not in {1, 2}<br>The only values of i for which this is true are 1, 2, and 3. Thus, {1, 2, 3} is generated. |
| $g_4(i)$ | {1, 2, 3} | (1, 2, 3) | g4 evaluates to:<br>f(i), not exists(j: f(j), j < i, not $g_3(j)$)<br>or<br>i is in {1, 2, 3} and there does not exist a value of j such that j is in {1, 2, 3}, j < i, and j is not in {1, 2, 3}<br>The only values of i for which this is true are 1, 2, and 3. Thus, {1, 2, 3} is generated. |

Because $g_3(i)$ and $g_4(i)$ have the same relation, naive evaluation ends after correctly producing the tuples {1, 2, 3}.

Semi-naive evaluation of g(i), however, produces incorrect results because of the negated recursive call. Semi-naive evaluation flattens the recursion of g(i) into the following evaluation predicates:

$\delta g_0(i)$:-{ }
$g_0(i)$:-{ }
$\delta g_{n+1}(i)$:-f(i), not exists(j: f(j), j<i, not $\delta g_n(j)$), not $g_n(i)$
$g_{n+1}(i)$:-$g_n(i)$; $\delta g_{n+1}(i)$ Semi-naive evaluation of g(i) would then progress as illustrated in TABLE 4.

TABLE 4

| Pred-icate | Relation | Comments |
|---|---|---|
| $\delta g_0(i)$ | { } | Empty by definition |
| $g_0(i)$ | { } | Empty by definition |
| $\delta g_1(i)$ | {1} | $\delta g_1(i)$ evaluates to:<br>f(i), not exists(j: f(j), j < i, not $\delta g_0(j)$), not $g_0(i)$<br>or<br>i is in {1, 2, 3} and there does not exist a value of j such that j is in {1, 2, 3}, j < i, and j is not in { } and i is not in { }<br>This is true only when i is 1. Thus, {1} is generated. |
| $g_1(i)$ | {1} | $g_1(i)$ evaluates to:<br>$g_0(i)$; $\delta g_1(i)$<br>or<br>i is in { } or i is in {1}<br>This is only true when i is 1. Thus, {1} is generated. |

TABLE 4-continued

| Predicate | Relation | Comments |
|---|---|---|
| $\delta g_2(i)$ | {2} | $\delta g_2(i)$ evaluates to:<br>f(i), not exists(j: f(j), j < i, not $\delta g_1(j)$), not $g_1(i)$<br>or<br>i is in {1, 2, 3} and there does not exist a value of j such that j is in {1, 2, 3}, j < i, and j is not in {1} and i is not in {1}<br>This is true only when i is 2. Thus, {2} is generated. |
| $g_2(i)$ | {1, 2} | $g_2(i)$ evaluates to:<br>$g_1(i)$; $\delta g_2(i)$<br>or<br>i is in {1} or i is in {2}<br>This is only true when i is 1 or i is 2. Thus, {1, 2} is generated. |
| $\delta g_3(i)$ | { } | $\delta g_2(i)$ evaluates to:<br>f(i), not exists(j: f(j), j < i, not $\delta g_2(j)$), not $g_2(i)$<br>or<br>i is in {1, 2, 3} and there does not exist a value of j such that j is in {1, 2, 3}, j < i, and j is not in {2} and i is not in {1, 2}<br>There are no values of j and i that satisfy this expression. This is because "not $\delta g_2(j)$" forecloses j being 2, but not j being 1, and thus there does exist a j, j = 1, that is less than i = 3. Thus, no values of i satisfy the delta predicate.<br>Therefore, $\delta g_3(i)$'s relation is empty. |

On the last iteration of semi-naive evaluation, $\delta g_3(i)$'s relation is empty. At this point, semi-naive evaluation ends, after incorrectly producing only {1, 2} and without producing 3. This occurs because the example predicate uses multiple values from the same recursive call to g(i). In other words, in order for the delta predicate $\delta g_3(i)$ to produce {3}, $\delta g_2(i)$ would need to produce {1, 2}. But the nature of delta predicates for semi-naive evaluation is such that 1 and 2 will never been in the same $\delta g_n(i)$ delta predicate.

SUMMARY

This specification describes technologies relating to a language construct that allows exiversal quantifiers to be expressed directly in a query language as well as techniques for evaluating recursive predicates in general and predicates having exiversal quantifiers as well as recursive exiversal predicates.

A predicate having an exiversal quantifier can be expressed in a query language as follows:

forex(i: x(i): y(i))

This notation asserts that two things are true: (1) that there exists a value for i such that x(i) holds and y(i) holds, and (2) that for all values of i such that x(i) holds, y(i) also holds.

A term having an exiversal quantifier may be referred to as an exiversal term, and a predicate having an exiversal term may be referred to as an exiversal predicate. An exiversal predicate can be evaluated to compute a relation having tuples that bind an input variable to all values that satisfy the exiversal quantifier, or, alternatively, to the empty relation if no such values exist.

Query languages that support exiversal quantification have advantages over other query languages that only support universal quantification. This is because in many situations, query languages with universal quantification generate trivial results.

The subject matter described in this specification can be implemented in particular embodiments so as to realize one or more of the following advantages. Query languages can include a language construct that supports exiversal quantifiers. Predicates having exiversal quantifiers can be used to obtain query results in situations where trivial results are undesirable. A system can evaluate recursive exiversal predicates efficiently and accurately even though evaluation includes evaluation of a negated recursive term and multiple recursive calls in a same disjunction. A system can evaluate recursive exiversal predicates and other expressions having a pattern matching that of an exiversal term without performing any rounds of naive evaluation, which can provide vast performance improvements.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes technologies that allow an exiversal quantifier language construct to be added to a query language. This specification also describes mechanisms for evaluating recursive predicates.

An example application for a query language that supports exiversal quantification occurs in static analysis systems. Static analysis refers to techniques for analyzing computer software source code without executing the source code as a software program. A static analysis system can use a query language to determine a variety of attributes about source code in a code base.

In static analysis systems, trivial results are a particular problem for a number of reasons. Modern code bases often include voluminous computer-generated source code. Computer-generated source code is likely to satisfy conditions asserted by predicates with universal quantifiers, but only because the computer-generated source code elements do so trivially. Another problem that arises in static analysis systems is identifying functions that are called in a particular way. Using only universal quantifiers may identify functions that are never called.

One example application of an exiversal predicate is to identify all C++ types defined in a code base that have at least one member function and that include only virtual functions. Such types may be referred to as C++ "interfaces" because they are analogous to interface types in Java.

The following C++ source code illustrates what might be considered a C++ interface. The example C++ code includes a type definition, C1, that can be considered a C++ interface because C1 has at least one member function, and all of its member functions are virtual functions.

```
struct C1 {
    virtual int foo( );
    virtual int bar( );
}
struct C2 : public C1 {
    int foo( ) { return 4; }
```

-continued

```
        int bar( ) { return 5; }
}
```

The term "virtual" in this context means that they have no default definition in C1. Instead, the function definitions must be supplied by a type that inherits from C1. In this case, the type C2 inherits from C1, and the definitions of foo( ) and bar( ) are supplied by the definitions in C2.

The following variation illustrates type definitions that are not considered to be C++ interfaces.

```
struct C3 {
    int foo( ) { return 4; }
};
struct C4 : public C3 {
    virtual int bar( );
    virtual int baz( );
};
struct C5;
```

In this example, the definition of type C4 includes only virtual functions. But C4 is not considered to be an interface because C4 inherits a nonvirtual function, "foo( )" from an ancestor type C3. In other words, types that inherit all virtual functions are still considered to be interfaces, but types that inherit nonvirtual functions are not considered to be interfaces.

The definition of C5 is empty. C5 is not considered to be an interface because it does not include any member functions.

This formulation of types that are considered to be C++ interfaces lends itself to being expressed as a predicate having an exiversal quantifier.

interface(t):-forex(i: member_method(t, i): virtual(i))

The exiversal predicate asserts that there exists a method i that is a member method of type t and that it is a virtual method, and that all member methods of type t are virtual. In this context, member_method(i) means all functions defined by type t or inherited by type t.

This exiversal predicate eliminates trivial results that an evaluation engine would generate if the predicate were written using only a universal quantifier. For example, the following predicate uses only a universal quantifier "forall":

interface(t):-forall(i: member_method(t, i): virtual(i))

Evaluating this predicate would result in a relation that includes types having no function definitions. For example, evaluating this predicate for C5 would incorrectly identify C5 as an interface, even though C5 has no function definitions.

The following code defines an example exiversal predicate in an object-oriented query language.

```
class Interface extends Class {
    Interface( ) {
        forex(    Declaration m :
                  m.getDeclaringType( ) = this.getABaseClass*( ) :
                  isPureVirtualFunction(m) )
    }
}
```

In this object-oriented query language, classes define predicates. This example class defines a predicate for finding C++ interfaces using an exiversal quantifier. When evaluated by an appropriately programmed evaluation engine, the example predicate returns tuples that identify all types that are interfaces.

The predicate definition includes a language construct that denotes exiversal quantification, "forex." The forex construct takes the form:

forex(local variables: condition x: condition y)

The local variables are declarations of variables whose values will be restricted by the following two conditions, condition x and condition y. Condition x and condition y are analogous to the x(i) and y(i) in the definition of exiversal predicates above.

The example predicate for finding C++ interfaces declares a local variable m, which has a type "Declaration." An evaluation engine that evaluates this exiversal language construct will find all types that (1) include at least one declaration m that satisfies condition x and condition y, and (2) have only declarations m such that whenever condition x holds then condition y also holds.

Condition x in this example uses two auxiliary functions, "getDeclaringType( )" and "getABaseClass*( )". The expression "m.getDeclaringType( )" returns, for a method m, the type in which m is declared. The expression "this.getABaseClass*( )" returns a union of (1) all declarations in the type under consideration, denoted by "this," and (2) all declarations in supertypes of the type under consideration. In other words, "m.getDeclaringType( )=this.getABaseClass*( )" states that m is a member of the type or is inherited by the type.

Condition y in this example uses a predicate isPureVirtualFunction, which asserts that m is a virtual function. In other words, a method m is virtual in the type under consideration as well as any supertypes of the type under consideration.

Figure 1:
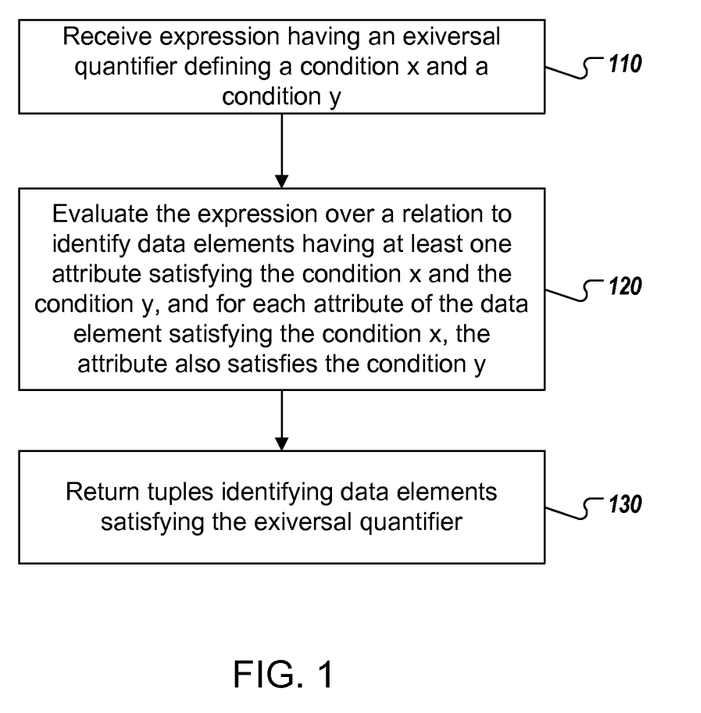
FIG. 1 is a flow chart of an example process for evaluating exiversal predicates.

FIG. 1 is a flow chart of an example process for evaluating exiversal predicates. In general, an evaluation engine of a particular query language receives an expression in a particular query language that includes an exiversal predicate. The evaluation engine then returns tuples that satisfy the exiversal predicate, or the empty relation if no such tuples exist. The process will be described as being performed by an appropriately programmed system of one or more computers.

The system receives an expression having an exiversal quantifier defining a condition x and a condition y (110). The expression generally operates on an associated relation of data elements. The system will apply the condition x and the condition y to attributes of each data element in the relation to identify data elements that satisfy the expression.

The system identifies data elements having at least one attribute satisfying the condition x and the condition y, and for each attribute of the data element satisfying the condition x, the attribute also satisfies the condition y (120). For example, the example predicate above that uses an exiversal quantifier to find C++ interfaces can be called using the following example query:

from Type t
where Interface(t)
select t

This example query identifies the relation "Type." The system obtains results for the query by evaluating the "Interface" predicate defined above over data elements in the Type relation.

The system can iterate over data elements in the relation to identify data elements that satisfy the exiversal predicate. For example, the system can first iterate over data elements to identify data elements that have at least one attribute satisfying the condition x and the condition y. Upon finding such a data element, the system can then determine whether for each attribute that satisfies the condition x, the attribute also satisfies the condition y. The system can also first identify data elements for which all attributes satisfying the condition x also satisfy the condition y and then filter out data elements that do not have at least one attribute satisfying the condition x and the condition y. Other evaluation strategies can also be used.

In some implementations, the system transforms the exiversal term into an equivalent combination of subterms and evaluates the subterms. For example, the system can transform the exiversal term "forex(i: x(i): y(i))" into the following conjunction of subterms:

exists(i: x(i), y(i)) and forall(i: x(i): y(i)).

The system could evaluate these subterms as described above. In other words, the system could evaluate the "forall" term to identify data elements having attributes satisfying the condition x and the condition y. The system could then filter out data elements that do not have at least one attribute satisfying the condition x and the condition y.

This term can be further transformed into a conjunction of two existential terms. The first term is a non-negated term having a first existential quantifier, and the second term is a negated term having a second existential quantifier. The modifiers "first" and "second" are used only for clarity and do not imply an ordering between the terms. Rather, the terms can occur in any order, and the system can evaluate the terms in any order or in parallel.

The following is an example of a transformed term having a conjunction of a negated term and a non-negated term:

exists(i: x(i), y(i)) and not exists(i: x(i), not y(i))

The first existential term of the conjunction "exists(i: x(i), y(i))" is the non-negated term, which states that there is an i such that x(i) holds and y(i) holds. The second existential term of the conjunction "not exists(i: x(i), not y(i))" is the negated term, which states that there does not exist an i for which x(i) holds and y(i) does not hold. The system can then evaluate the predicate using the semantics and evaluation strategies of existential quantifiers.

Due to the monotonicity requirement for predicates, x(i) cannot include any recursive calls. This is because the call to x(i) in the negated term is under one more negation than the call to x(i) in the non-negated term. Thus, one of the two calls to x(i) would result in a recursive call under an odd number of negations. And as explained above, a recursive call under an odd number of negations violates the monotonicity requirement for recursive predicates. Therefore, the system can reject exiversal predicates that include a recursive call in x(i).

In contrast, y(i) can include recursive calls. When y(i) includes a recursive call, the predicate assumes a few properties that, if not handled with care, could violate monotonicity or lead to a failure to find a least fixed point.

First, the transformed predicate includes multiple recursive calls to y(i), which occur in the same conjunction. Secondly, the transformed predicate includes a negation to y(i), "not y(i)" in the second negated term. Thus, if y(i) includes a recursive call, the predicate would include a negated recursive call. As described above, a negated recursive call may cause pure semi-naive evaluation to fail to find a correct result.

Therefore, the system can perform evaluation processes that preserve monotonicity and that guarantee that a fixed point can be reached. Two of such evaluation processes will be described in more detail below with reference to FIG. 2 and FIG. 3.

Figure 2:
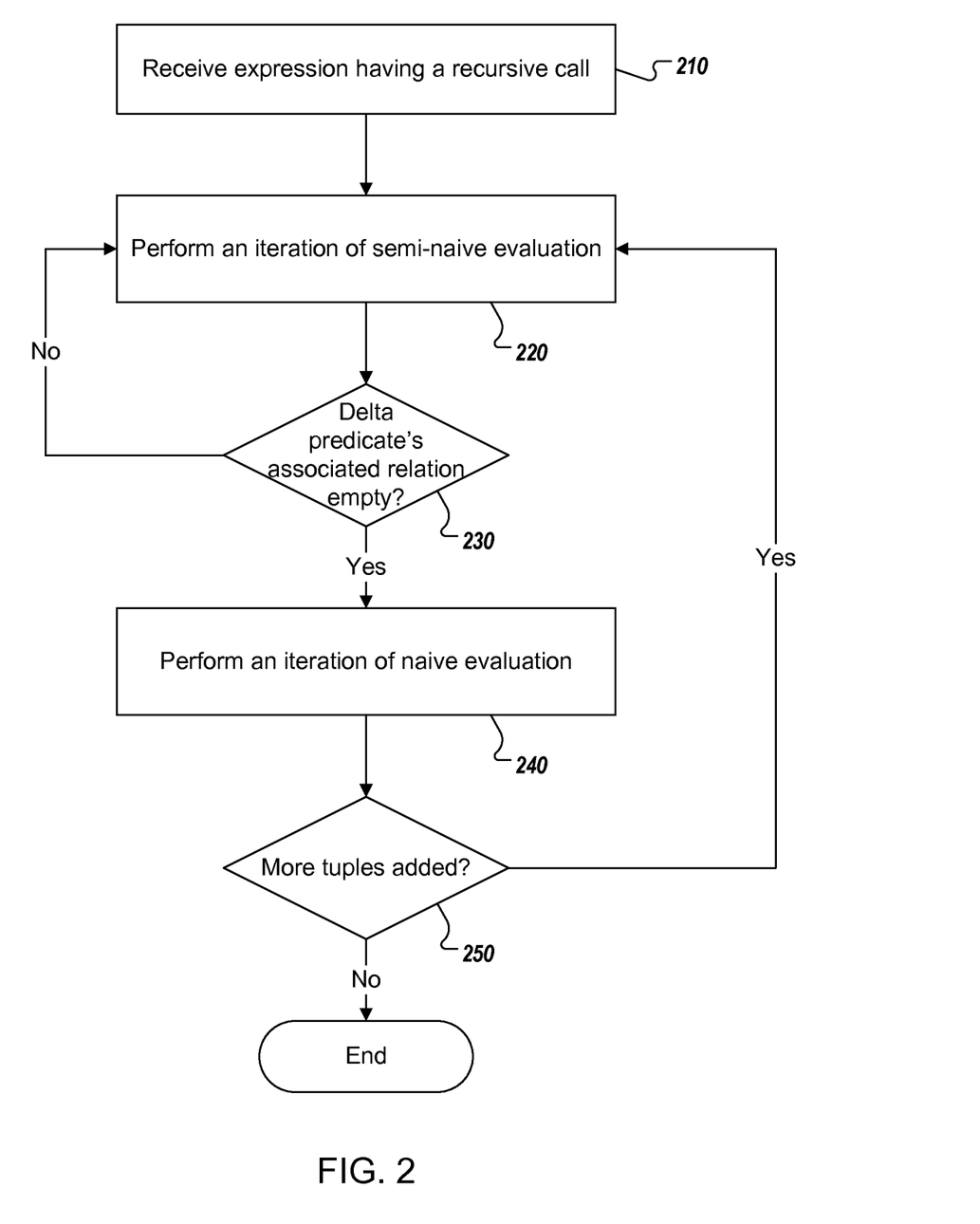
FIG. 2 is a flow chart of an example process for evaluating a recursive predicate.
Figure 3:
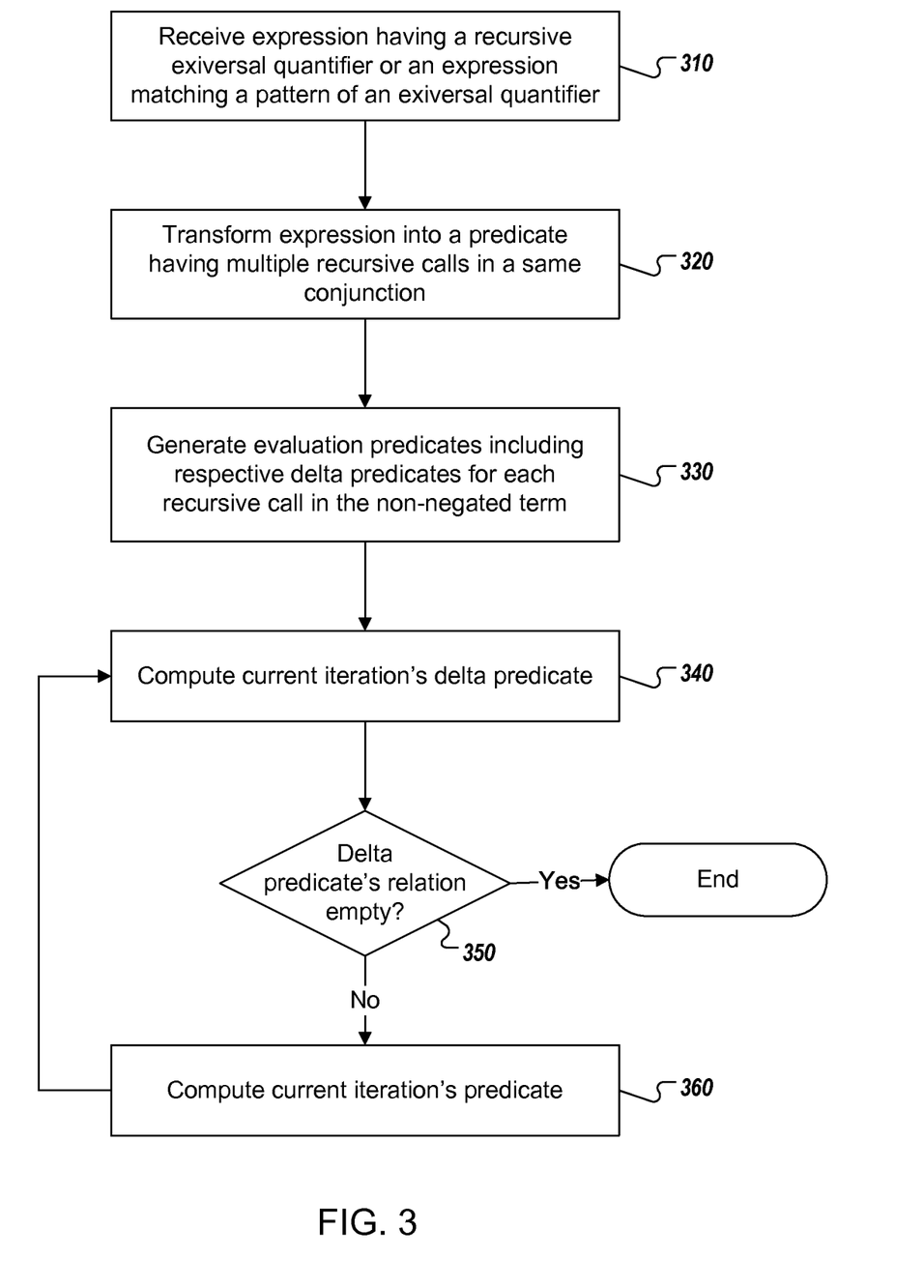
FIG. 3 is a flow chart of an example process for evaluating recursive exiversal predicates.

The system can also apply the evaluation strategies described in reference to FIG. 2 and FIG. 3 to other predicates having the same pattern as one of the transformed terms above. Thus, the efficient evaluation strategies described in FIG. 2 and FIG. 3 can also be employed by systems implementing languages without exiversal quantifiers.

For example, the system may receive an expression that defines a predicate having a conjunction of an existential term and a universal term or two existential terms that match the form of the transformed term above. In that situation, the system can use the evaluation procedures described in FIG. 2 and FIG. 3 regardless of whether or not the expression originated from an exiversal predicate. This can be particularly useful when there is a recursive call in y(i).

The system returns tuples identifying data elements satisfying the exiversal predicate (130). For example, if using the example C++ types in the examples above, only the type C1 was considered to be a C++ interface. Thus, the system could return the following tuple in response to the query.

(C1)

FIG. 2 is a flow chart of an example process for evaluating a recursive predicate. The example process can be used to evaluate any recursive predicate, including recursive exiversal predicates. In particular, the process can evaluate negated recursive predicates. As described above, pure semi-naive evaluation may produce incorrect results for a predicate having a negated recursive call. The process will be described as being performed by an appropriately programmed system of one or more computers.

The system receives an expression having a recursive call (210).

The system performs an iteration of semi-naive evaluation (220). As described above, semi-naive evaluation uses a delta predicate defined to include only new tuples found during a particular iteration.

The system determines whether the delta predicate's associated relation is empty (230). If the delta predicate's associated relation contains at least one tuple, the system has produced new tuples on that iteration of semi-naive evaluation. Thus, the process continues by performing another iteration of semi-naive evaluation (branch to 220).

If the delta predicate's associated relation is empty, the system performs an iteration of naive evaluation (branch to 240). Ordinary semi-naive evaluation ends when the delta predicate's associated relation is empty. As illustrated above, this may lead to ending evaluation prematurely.

The system can perform an iteration of naive evaluation using the ending result of semi-naive evaluation as the previous result set. To continue the example from TABLE 4 above, the system can perform an iteration of naive evaluation as illustrated in TABLE 5.

TABLE 5

| Predicate | Previous relation | Current relation | Comments |
|---|---|---|---|
| $g_4(i)$ | {1, 2} (from end of semi-naive evaluation) | {1, 2, 3} | $g_4$ evaluates to:<br>f(i), not exists(j: f(j), j < i, not $g_3$(j))<br>or<br>i is in {1, 2, 3} and there does not exist a value of j such that j is in {1, 2, 3}, j < i, and j is not in {1, 2}<br>The only values of i for which this is true are 1, 2, and 3. Thus, {1, 2, 3} is generated. |

The system determines whether more tuples have been added (250). To do so, the system can subtract the tuples produced by the iteration of naive evaluation from the tuples produced at the end of the last iteration of semi-naive evaluation.

In this case, the last iteration of semi-naive evaluation, $g_2(i)$ produced {1, 2}, and the iteration of naive evaluation produced {1, 2, 3}. Thus, the difference is {3}.

If more tuples were added, the system then performs another iteration of semi-naive evaluation (branch to 220). To continue the example, the system can perform an iteration of semi-naive evaluation as illustrated in TABLE 6.

TABLE 6

| Predicate | Relation | Comments |
|---|---|---|
| $\delta g_4(i)$ | {3} | Computed by the difference between naive evaluation and the last iteration of semi-naive evaluation. |
| $\delta g_5(i)$ | { } | $\delta g_5(i)$ evaluates to:<br>f(i), (not exists(j: f(j), j < i, not $\delta g_4(j)$)), not $g_4(i)$<br>or<br>i is in {1, 2, 3} and there does not exist a value of j such that j is in {1, 2, 3}, j < i, and j is not in {3} and i is not in {1, 2, 3}<br>Therefore, $\delta g_5(i)$ is empty. |
| $g_5(i)$ | {1, 2, 3} | $g_5(i)$ evaluates to:<br>$g_4(i)$; $\delta g_5(i)$<br>or<br>i is in {1, 2, 3} or i is in { }<br>Thus {1, 2, 3} is generated. |

The system then determines that the relation associated with the delta predicate $\delta g_5(i)$ is the empty relation (230), so the system then performs another iteration of naive evaluation (branch to 240). The next iteration of naive evaluation is illustrated in TABLE 7.

TABLE 7

| Predicate | Previous relation | Current relation | Comments |
|---|---|---|---|
| $g_6(i)$ | {1, 2, 3} | {1, 2, 3} | $g_6$ evaluates to:<br>f(i), not exists(j: f(j), j < i, not $g_5(j)$)<br>or<br>i is in {1, 2, 3} and there does not exist a value of j such that j is in {1, 2, 3}, j < i, and j is not in {1, 2, 3}<br>Because j cannot both be in {1, 2, 3} and not be in {1, 2, 3}, this expression is true for i being 1, 2, or 3.<br>Thus, {1, 2, 3} is generated, and the current relation is equal to the previous relation. |

If no more tuples have been added (250), the process ends (branch to end). For example, the system can compare the current relation with the previous relation to determine that no new tuples have been added after the latest round of naive evaluation.

Because of the way the example process illustrated in FIG. 2 switches back and forth between naive evaluation and semi-naive evaluation, this process may be referred to as staircase evaluation.

FIG. 3 is a flow chart of an example process for evaluating recursive exiversal predicates. The example process for evaluating recursive exiversal predicates has several advantageous properties. Evaluating a recursive exiversal predicate typically involves evaluating a negated recursive call, but the example process illustrated in FIG. 3 can produce a correct result without using naive evaluation or staircase evaluation. Furthermore, evaluating a recursive exiversal predicate typically involves evaluating a predicate having multiple recursive calls in the same disjunction, but the example process in FIG. 3 can produce a correct result using only one delta predicate. The process will be described as being performed by an appropriately programmed system of one or more computers.

The system receives an expression having a recursive exiversal quantifier or an expression matching a pattern of an exiversal quantifier (310). As described above, a predicate having an exiversal quantifier includes a condition x and a condition y, and the condition y may include a recursive call.

The system can perform the same efficient evaluation strategy for other expressions matching one of several term patterns of an exiversal quantifier. Such an expression is one that when evaluated produces results that are equivalent to the results produced by evaluating an exiversal quantifier. Such expressions also typically specify a condition x and a condition y.

For example, as described above with reference to FIG. 1, the following are expressions that match the term pattern of an exiversal quantifier:

exists(i: x(i), y(i)) and not exists(i: x(i), not y(i))

and exists(i: x(i), y(i)) and forall(i: x(i): y(i)).

In order to illustrate the evaluation strategy outlined below, consider the following example predicates:

f(i):-i=1; i=2; i=3 g(i):-i=1; (f(i), forex(j: f(j), j<i: g(j)))

The predicate g(i) includes an exiversal quantifier over j with two conditions. The condition x, represented as "f(j), j<i", states that j is in {1,2,3} and j is less than i. And the condition y, represented as "g(j)", is a recursive call which states that j is in relation of g.

The system transforms the expression into a predicate having multiple recursive calls in a same conjunction (320). As explained above with reference to FIG. 1, the system can transform the expression by generating a conjunction having a non-negated term and a negated term. Thus, the system can transform the preceding example predicate g(i), which had a recursive term g(j) within an exiversal term, into the following form:

g(i):-i=1; (f(i), exists(j: f(j), j<i, g(j)), not exists(j: f(j), j<i, not g(j)))

The transformed expression includes both multiple recursive calls to g(j) in a same conjunction as well as a negated recursive call, "not g(j)".

The system generates evaluation predicates including respective delta predicates for each recursive call in the non-negated term (330).

For example, the system can flatten the recursion of g(i) by generating the following evaluation predicates. The evaluation predicates include an initial delta predicate $\delta g_0(i)$, an initial predicate $g_0(i)$, a single delta predicate $\delta g_{n+1}(i)$, and a current iteration's predicate $g_{n+1}(i)$.

$\delta g_0(i)$:-{ }

$g_0(i)$:-{ }

$\delta g_{n+1}(i)$:-(i=1; (f(i), exists(j: f(j), j<i, $\delta g_n(j)$, not exists(j: f(j), j<i, not $g_n(j)$))), not $g_n(i)$ $g_{n+1}(i)$:-$g_n(i)$; $\delta g_{n+1}(i)$ The current iteration's delta predicate $\delta g_{n+1}(i)$ replaces only the recursive call in the non-negated term "exists(j: f(j), j<i, g(j))" with the previous iteration's delta predicate $\delta g_n(j)$. Importantly, the system does not generate a delta predicate for the recursive call in the negated term "not exists(j: f(j), j<i, not g(j))". Thus, the system can evaluate this example exiversal predicate using only a single delta predicate on each iteration, which is generally more efficient than evaluating multiple delta predicates on each iteration.

In this example, the exiversal term included only a single recursive call. But if the exiversal term included multiple recursive calls in y(i), the system would generate respective delta predicates for each recursive call occurring in the non-negated term. However, the system would not generate any delta predicates for any of the recursive calls in the negated term.

The system can then evaluate the current iteration's results by repeatedly computing the union of a previous iteration's predicate and the current iteration's delta predicate until the relation for the delta predicate for a particular iteration is empty.

Thus, the system computes a current iteration's delta predicate (340). As mentioned above, for this example the system can use only a single delta predicate to compute newly generated tuples for the current iteration. If y(i) includes multiple recursive calls, the system would define multiple sub-delta predicates only for recursive calls occurring in the non-negated term as described above. And the system could compute the current iteration's delta predicate by computing the disjunction of tuples generated by evaluating the multiple sub-delta predicates.

The system determines whether the delta predicate's associated relation is empty (350). The delta predicate's relation being empty indicates that the least fixed point has been reached. If the delta predicate's relation contains at least one tuple, the system computes an associated relation for the current iteration's predicate (branch to 360). The system then returns to compute an associated relation for the next iteration's delta predicate (340).

If the delta predicate's relation is empty, the process ends (branch to end). In other words, the first time the delta predicate's associated relation is empty, the system can stop and return an indication that the relation for the recursive exiversal predicate has been computed. This is true even though the transformed predicate included a negated recursive call. In other words, the system can compute the least fixed point of the recursive exiversal predicate without needing to perform naive evaluation or staircase evaluation. And because performing any rounds of naive evaluation is potentially very costly, the process shown in FIG. 3 can provide vast performance improvements.

Evaluation of the example exiversal predicate according to the example process is illustrated in TABLE 8.

TABLE 8

| Predicate | Relation | Comments |
|---|---|---|
| $\delta g_0(i)$ | { } | Empty by definition |
| $g_0(i)$ | { } | Empty by definition |
| $\delta g_1(i)$ | {1} | $\delta g_1(i)$ evaluates to:<br>(i = 1; (f(i), exists(j: f(j), j < i, $\delta g_0(j)$), not exists(j: f(j), j < i, not $g_0(j)$))), not $g_0(i)$<br>or<br>i = 1<br>OR<br>i is in {1, 2, 3}<br>AND<br>there exists a value of j such that j is in {1, 2, 3}, j < i, and j is in { }<br>AND<br>there does not exist a value of j such that j is in {1, 2, 3}, j < i, and j is in { }<br>and<br>i is not in { } |

TABLE 8-continued

| Predicate | Relation | Comments |
|---|---|---|
| | | The only value of i for which this is true is 1. Thus, {1} is generated. |
| $g_1(i)$ | {1} | $g_1(i)$ evaluates to:<br>$g_0(i)$; $\delta g_1(i)$<br>or<br>i is in { }; i is in {1}<br>Thus {1} is generated. |
| $\delta g_2(i)$ | {2} | $\delta g_2(i)$ evaluates to:<br>(i = 1; (f(i), exists(j: f(j), j < i, $\delta g_1(j)$), not exists(j: f(j), j < i, not $g_1(j)$))), not $g_1(i)$<br>or<br>i is in {1, 2, 3}<br>AND<br>there exists a value of j such that j is in {1, 2, 3}, j < i, and j is in {1}<br>AND<br>there does not exist a value of j such that j is in {1, 2, 3}, j < i, and j is in {1}<br>and<br>i is not in {1}<br>The only value of i for which this is true is 2. Thus, {2} is generated. |
| $g_2(i)$ | {1, 2} | $g_2(i)$ evaluates to:<br>$g_1(i)$; $\delta g_2(i)$<br>or<br>i is in {1}; i is in {2}<br>This {1, 2} is generated. |
| $\delta g_3(i)$ | {3} | $\delta g_3(i)$ evaluates to:<br>(i = 1; (f(i), exists(j: f(j), j < i, $\delta g_2(j)$), not exists(j: f(j), j < i, not $g_2(j)$))), not $g_2(i)$<br>or<br>i = 1<br>OR<br>i is in {1, 2, 3}<br>AND<br>there exists a value of j such that j is in {1, 2, 3}, j < i, and j is in {2}<br>AND<br>there does not exist a value of j such that j is in {1, 2, 3}, j < i, and j is in {1, 2}<br>and<br>i is not in {1, 2}<br>The only value of i for which this is true is 3. Thus, {3} is generated. |
| $g_3(i)$ | {1, 2, 3} | $g_3(i)$ evaluates to:<br>$g_2(i)$; $\delta g_3(i)$<br>or<br>i is in {1, 2}; i is in {3}<br>Thus {1, 2, 3} is generated. |
| $\delta g_4(i)$ | { } | $\delta g_4(i)$ evaluates to:<br>(i = 1; (f(i), exists(j: f(j), j < i, $\delta g_3(j)$), not exists(j: f(j), j < i, not $g_3(j)$))), not $g_3(i)$<br>or<br>i = 1<br>OR<br>i is in {1, 2, 3}<br>AND<br>there exists a value of j such that j is in {1, 2, 3}, j < i, and j is in {3}<br>AND<br>there does not exist a value of j such that j is in {1, 2, 3}, j < i, and j is in {1, 2, 3}<br>and<br>i is not in {1, 2, 3}<br>There is no such value of i. Therefore, $\delta g_4(i)$'s relation is empty. |

As illustrated in TABLE 8, the system was able to identify the least fixed point after only four iterations with a single delta predicate, and without using naive or staircase evaluation.

As mentioned above, exiversal quantifiers are useful in static analysis systems. Static analysis systems are commonly employed to identify functions in a source code base that have particular attributes.

One such task for identifying functions that have particular attributes is to find all test helper methods. A static analysis system can consider a method to be a test helper method if the method is only called from test methods or other test helper methods. In other words, a method m is a test helper method if all calls to m are from either test methods or test helper methods.

The following code defines an example recursive exiversal predicate "testHelper" to find what a static analysis system would consider to be test helper methods.

```
predicate testHelper(Method m) {
    forex(   Call call, Method caller :
             call.getCallee( ) = m and call.getCaller( ) = caller :
             isTestMethod(caller) or
                  testHelper(caller)
    )
}
```

As mentioned above, the forex construct takes the form:
forex(local variables: condition x: condition y)

The local variables in this example are "Call call" and "Method caller."

Condition x in this example uses two auxiliary functions: (1) "getCallee( )", which returns an identification of a function that was called, and (2) "getCaller( )", which returns an identification of which function called the function that was called.

Condition y in this example uses a predicate is Test-Method, which asserts that the caller is a test method. Condition y also includes a recursive call to the testHelper predicate.

When defined in this way, the example recursive exiversal predicate will find all functions that are called at least once by a test method or a test helper method, and, for those functions that are called at least once by a test method or a test helper method, every instance of the function being called is by a test method or a test helper method. If a static analysis system were to use only universal quantifier instead of an exiversal quantifier, evaluation of the predicate above would return all functions that are never called, giving many spurious results.

The example predicate can be invoked using the following example query.

from Method m
where testHelper(m)
select m

The query identifies a relation "Method," which includes data elements representing methods in a code base and their respective attributes. Such attributes can include each instance of the function being called, and, for each instance, the calling function.

The system can then obtain results for the query evaluating the testHelper predicate over data elements in the Method relation. The results are tuples that identify all methods in the Method relation that are considered to be test helper methods.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

In addition to the embodiments of the attached embodiments and the embodiments described above, the following embodiments are also innovative:

Embodiment 1 is a method comprising:

receiving an expression having a programming language construct representing an exiversal predicate having an exiversal quantifier, wherein the construct specifies a condition x and a condition y; and evaluating the expression over a relation of data elements to identify each data element in the relation having at least one attribute satisfying the condition x and the condition y, and, for each attribute of the data element satisfying the condition x, the attribute also satisfies the condition y.

Embodiment 2 is the method of embodiment 1, wherein the condition y includes a recursive call to the expression, and wherein evaluating the expression comprises:

transforming the expression into a second expression having multiple recursive calls, the second expression having a first non-negated term with a first recursive call in the condition y, and a second negated term with a second recursive call in the condition y;

generating evaluation predicates including a single delta predicate that replaces only the recursive call in the first non-negated term; and evaluating the second expression using the generated evaluation predicates to identify data elements in the relation satisfying the expression.

Embodiment 3 is the method of embodiment 2, wherein the condition y includes multiple recursive calls, and wherein generating the evaluation predicates comprises generating respective delta predicates for each recursive call occurring in the first non-negated term.

Embodiment 4 is the method of any one of embodiments 2-3, wherein transforming the expression into a second expression predicate having multiple recursive calls comprises:

transforming the exiversal predicate into the following conjunction of existential terms:

exists(i: x(i), y(i)) and not exists(i: x(i), not y(i))

and evaluating the conjunction of existential predicates to identify data elements in the relation satisfying the exiversal predicate.

Embodiment 5 is the method of any one of embodiments 2-4, wherein evaluating the second expression comprises repeatedly:

using the single delta predicate to generate new tuples for a current iteration; and computing a relation for the current iteration, the relation including the new tuples for the current iteration and one or more tuples from a previous iteration, until no new tuples are generated for a current iteration.

Embodiment 6 is the method of any one of embodiments 2-5, wherein evaluating the second expression comprises evaluating the second expression without performing any iterations of naive evaluation.

Embodiment 7 is the method of any one of embodiments 1-6, wherein the condition y includes a recursive call to the expression, and wherein evaluating the expression comprises:

transforming the expression into a second expression having a negated recursive call; and evaluating the second expression without performing staircase evaluation or naive evaluation.

Embodiment 8 is the method of embodiment 1, wherein evaluating the expression comprises:

generating a first plurality of semi-naive evaluation predicates;

performing one or more iterations of semi-naive evaluation according to the first plurality of semi-naive evaluation predicates, including at least one delta predicate;

determining that the relation of the delta predicate is empty; and in response, generating a naive evaluation predicate and performing an iteration of naive evaluation according to the naive evaluation predicate.

Embodiment 9 is the method of embodiment 8, further comprising:

determining that the iteration of naive evaluation added more tuples to the relation; and in response, performing another iteration of semi-naive evaluation according to the first plurality of semi-naive evaluation predicates.

Embodiment 10 is the method of any one of embodiments 8-9, further comprising:

determining that the iteration of naive evaluation did not add more tuples to the relation; and in response, designating the relation as a final relation for the exiversal predicate.

Embodiment 11 is a method comprising:

receiving an expression having a predicate with a negated recursive call;

generating a first plurality of semi-naive evaluation predicates;

performing one or more iterations of semi-naive evaluation according to the first plurality of semi-naive evaluation predicates, including at least one delta predicate;

determining that a relation for the delta predicate is empty; and in response, generating a naive evaluation predicate and performing an iteration of naive evaluation according to the naive evaluation predicate.

Embodiment 12 is the method of embodiment 11, further comprising:

determining that the iteration of naive evaluation added more tuples to a result set; and in response, performing another iteration of semi-naive evaluation according to the first plurality of evaluation predicates.

Embodiment 13 is the method of any one of embodiments 11-12, further comprising:

determining that the iteration of naive evaluation did not add more tuples to the relation; and in response, designating the relation as a final relation for the expression.

Embodiment 14 is a method comprising:

receiving an expression representing a conjunction of terms matching the form of an exiversal term and identifying a relation of data elements over which to apply the expression, wherein each term in the conjunction of terms specifies a condition x and a condition y;

determining that the condition y includes a recursive call to the expression;

in response, generating evaluation predicates for the expression, including generating a single delta predicate that replaces only a recursive call in a particular term of the conjunction of terms; and evaluating the expression over the relation of data elements to identify each data element in the relation satisfying the conjunction, including repeatedly:

using the single delta predicate to generate new tuples for a current iteration, and computing a relation for the current iteration, the relation including the new tuples for the current iteration and one or more tuples from a previous iteration, until no new tuples are generated for a current iteration.

Embodiment 15 is method of embodiment 14, wherein the conjunction of terms is a conjunction of a non-negated existential term and a negated existential term.

Embodiment 16 is the method of any one of embodiments 14-15, wherein the expression has the form:

exists(i: x(i), y(i)) and not exists (i: x(i), not y(i))

wherein x(i) represents the condition x and y(i) represents the condition y.

Embodiment 17 is the method of any one of embodiments 15-16, wherein the particular term is the non-negated existential term, and wherein generating the single delta predicate comprises generating a delta predicate that replaces only a recursive call in the non-negated existential term.

Embodiment 18 is the method of embodiment 14, wherein the conjunction of terms is a conjunction of a non-negated existential term and a term having a universal quantifier.

Embodiment 19 is the method of any one of embodiments 14 or 18, wherein the particular term is the non-negated existential term, and wherein generating the single delta predicate comprises generating a delta predicate that replaces only a recursive call in the non-negated existential term.

Embodiment 20 is the method of any one of embodiments 18-19, wherein the expression has the form:

exists(i: x(i), y(i)) and forall(i: x(i): y(i))

wherein x(i) represents the condition x and y(i) represents the condition y.

Embodiment 21 is the method of any one of embodiments 14-20, wherein the condition y includes multiple recursive calls, and wherein generating the evaluation predicates comprises generating respective delta predicates for each recursive call occurring in the particular term of the conjunction of terms.

Embodiment 22 is the method of any one of embodiments 14-21, wherein evaluating the expression comprises evaluating the expression without performing any iterations of naive evaluation.

Embodiment 23 is a system comprising: one or more computers and one or more storage devices storing instructions that are operable, when executed by the one or more computers, to cause the one or more computers to perform the method of any one of embodiments 1 to 22.

Embodiment 24 is a computer storage medium encoded with a computer program, the program comprising instructions that are operable, when executed by data processing apparatus, to cause the data processing apparatus to perform the method of any one of embodiments 1 to 22.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   receiving an original recursive expression that defines tuples belonging to an output relation, the original recursive expression having a programming language construct representing an exiversal predicate, wherein the construct specifies a condition x and a condition y, wherein the condition y includes a recursive call to the original recursive expression;
   transforming the original recursive expression, including replacing the exiversal predicate with a second expression having multiple recursive calls, the second expression having a first non-negated term with a first recursive call in the condition y, and a second negated term with a second recursive call in the condition y;
   setting the output relation to be initially empty;
   setting a delta relation to be initially empty;
   generating evaluation predicates, including generating a single delta predicate that replaces, in the second expression, the first recursive call in the first non-negated term with a call to a previous delta relation having tuples that were newly generated on an immediately preceding iteration; and
   generating an output relation comprising output tuples satisfying the original recursive expression, including performing operations over multiple iterations until the single delta predicate generates no new tuples, the operations comprising:
      evaluating the single delta predicate having the call to the previous delta relation to generate one or more new tuples belonging to a current delta relation on a current iteration; and
      adding, to the output relation, the one or more new tuples belonging to the current delta relation on the current iteration.

2. The method of claim 1, wherein the condition y includes multiple recursive calls, and wherein generating the evaluation predicates comprises generating multiple respective delta predicates for each recursive call occurring in the first non-negated term.

3. The method of claim 1, wherein transforming the original recursive expression into the second expression having multiple recursive calls comprises:
   transforming the exiversal predicate into the following conjunction of existential terms:
      exists(i: x(i), y(i)) and not exists(i: x(i), not y(i)),
      wherein x(i) is the condition x and wherein y(i) is the condition y.

4. The method of claim 1, wherein performing the operations over multiple iterations comprises evaluating the evaluation predicates without performing any iterations of naive evaluation.

5. The method of claim 4, wherein performing the operations over multiple iterations comprises:
   evaluating the evaluation predicates without performing staircase evaluation.

6. A computer-implemented method comprising:
   receiving an original recursive expression that defines tuples belonging to an output relation, the original recursive expression having a conjunction of terms matching the form of an exiversal term and identifying a relation of data elements over which to apply the original recursive expression, wherein each term in the conjunction of terms specifies a condition x and a condition y;
   determining that the condition y includes a recursive call to the original recursive expression;
   in response, generating evaluation predicates for the expression, including generating a single delta predicate that replaces only a recursive call in a particular term of the conjunction of terms with a call to a previous delta relation having tuples that were newly generated on an immediately preceding iteration; and
   evaluating the evaluation predicates over the relation of data elements to identify each data element in the relation satisfying the conjunction, including repeatedly:
      using the single delta predicate to generate new tuples for a current iteration, and
      computing a relation for the current iteration, the relation including the new tuples for the current iteration and one or more tuples from a previous iteration, until no new tuples are generated for a current iteration.

7. The method of claim 6, wherein the conjunction of terms is a conjunction of a non-negated existential term and a negated existential term.

8. The method of claim 7, wherein the original recursive expression has the form:
   exists(i: x(i), y(i)) and not exists (i: x(i), not y(i))
   wherein x(i) represents the condition x and y(i) represents the condition y.

9. The method of claim 7, wherein the particular term is the non-negated existential term, and wherein generating the single delta predicate comprises generating a delta predicate that replaces only a recursive call in the non-negated existential term.

10. The method of claim 6, wherein the conjunction of terms is a conjunction of a non-negated existential term and a term having a universal quantifier.

11. The method of claim 10, wherein the particular term is the non-negated existential term, and wherein generating the single delta predicate comprises generating a delta predicate that replaces only a recursive call in the non-negated existential term.

12. The method of claim 10, wherein the original recursive expression has the form:
   exists(i: x(i), y(i)) and forall(x(i): y(i))
   wherein x(i) represents the condition x and y(i) represents the condition y.

13. The method of claim 6, wherein the condition y includes multiple recursive calls, and wherein generating the evaluation predicates comprises generating multiple respective delta predicates for each recursive call occurring in the particular term of the conjunction of terms.

14. The method of claim 6, wherein evaluating the evaluation predicates comprises evaluating the evaluation predicates without performing any iterations of naive evaluation.

15. A system comprising:
   one or more computers and one or more storage devices storing instructions that are operable, when executed by the one or more computers, to cause the one or more computers to perform operations comprising:
      receiving an original recursive expression that defines tuples belonging to an output relation, the original recursive expression having a programming language construct representing an exiversal predicate, wherein the construct specifies a condition x and a condition y, wherein the condition y includes a recursive call to the original recursive expression;
      transforming the original recursive expression, including replacing the exiversal predication with a second expression having multiple recursive calls, the second expression having a first non-negated term with a first recursive call in the condition y, and a second negated term with a second recursive call in the condition y;

setting the output relation to be initially empty;

setting a delta relation to be initially empty;

generating evaluation predicates including, generating a single delta predicate that replaces, in the second expression, the first recursive call in the first non-negated term with a call to a previous delta relation having tuples that were newly generated on an immediately preceding iteration; and generating an output relation comprising output tuples satisfying the original recursive expression, including performing operations over multiple iterations until the single delta predicate generates no new tuples, the operations comprising:

evaluating the single delta predicate having the call to the previous delta relation to generate one or more new tuples belonging to a current delta relation on a current iteration; and adding, to the output relation, the one or more new tuples belonging to the current delta relation o the current iteration.

16. The system of claim 15, wherein the condition y includes multiple recursive calls, and wherein generating the evaluation predicates comprises generating multiple respective delta predicates for each recursive call occurring in the first non-negated term.

17. The system of claim 15, wherein transforming the original recursive expression into the second expression having multiple recursive calls comprises:

transforming the exiversal predicate into the following conjunction of existential terms:

exists(i: x(i), y(i)) and not exists(i: x(i), not y(i)), wherein x(i) is the condition x and wherein y(i) is the condition y.

18. The system of claim 15, wherein performing the operations over multiple iterations comprises evaluating the evaluation predicates without performing any iterations of naive evaluation.

19. The system of claim 18, wherein performing the operations over multiple iterations comprises evaluating the evaluation predicates without performing staircase evaluation.

20. A system comprising:

one or more computers and one or more storage devices storing instructions that are operable, when executed by the one or more computers, to cause the one or more computers to perform operations comprising:

receiving an original recursive expression that defines tuples belonging to an output relation, the original recursive expression having a conjunction of terms matching the form of an exiversal term and identifying a relation of data elements over which to apply the original recursive expression, wherein each term in the conjunction of terms specifies a condition x and a condition y;

determining that the condition y includes a recursive call to the original recursive expression;

in response, generating evaluation predicates for the expression, including generating a single delta predicate that replaces only a recursive call in a particular term of the conjunction of terms with a call to a previous delta relation having tuples that were newly generated on an immediately preceding iteration; and evaluating the evaluation predications over the relation of data elements to identify each data element in the relation satisfying the conjunction, including repeatedly:

using the single delta predicate to generate new tuples for a current iteration, and computing a relation for the current iteration, the relation including the new tuples for the current iteration and one or more tuples from a previous iteration, until no new tuples are generated for a current iteration.

21. The system of claim 20, wherein the conjunction of terms is a conjunction of a non-negated existential term and a negated existential term.

22. The system of claim 21, wherein the original recursive expression has the form:

exists(i: x(i), y(i)) and not exists (i: x(i), not y(i))

wherein x(i) represents the condition x and y(i) represents the condition y.

23. The system of claim 21, wherein the particular term is the non-negated existential term, and wherein generating the single delta predicate comprises generating a delta predicate that replaces only a recursive call in the non-negated existential term.

24. The system of claim 20, wherein the conjunction of terms is a conjunction of a non-negated existential term and a term having a universal quantifier.

25. The system of claim 24, wherein the particular term is the non-negated existential term, and wherein generating the single delta predicate comprises generating a delta predicate that replaces only a recursive call in the non-negated existential term.

26. The system of claim 24, wherein the original recursive expression has the form:

exists(i: x(i), y(i)) and forall(x(i): y(i))

wherein x(i) represents the condition x and y(i) represents the condition y.

27. The system of claim 20, wherein the condition y includes multiple recursive calls, and wherein generating the evaluation predicates comprises generating respective delta predicates for each recursive call occurring in the particular term of the conjunction of terms.

28. The system of claim 20, wherein evaluating the evaluation predicates comprises evaluating the evaluation predicates without performing any iterations of naive evaluation.

* * * * *

UNITED STATES PATENT AND TRADEMARK OFFICE
CERTIFICATE OF CORRECTION

PATENT NO. : 10,262,269 B2
APPLICATION NO. : 14/840448
DATED : April 16, 2019
INVENTOR(S) : Ian Lynagh Page 1 of 1

It is certified that error appears in the above-identified patent and that said Letters Patent is hereby corrected as shown below:

In the Claims

Column 25, Line 21: In Claim 15, delete "o" and insert -- on --, therefor.

Signed and Sealed this
Tenth Day of September, 2019

Andrei Iancu
*Director of the United States Patent and Trademark Office*